United States Patent Office 2,997,376
Patented Aug. 22, 1961

2,997,376
SOLID COMPOSITE PROPELLANT CONTAINING POLYSULFIDE RUBBER FUEL BINDER
Charles E. Bartley, Altadena, Calif., assignor to California Institute Research Foundation, Pasadena, Calif., a corporation of California
No Drawing. Filed Dec. 5, 1946, Ser. No. 714,127
7 Claims. (Cl. 52—.5)

This application relates to propellants, more particularly to propellants for use in rocket motors, assisted takeoff jet motors, and in general for purposes of jet propulsion.

Among the principal objects of the present invention are:

First, to provide a solid propellant which is inherently flexible or yieldable over a wide temperature range, in fact rubberlike, whereby the propellant may be subjected to mechanical shock without fissuring or otherwise being damaged so that its burning characteristics are not thus altered.

Second, to provide a propellant which comprises a liquid polysulfide and an oxidizing agent which are mixed and vulcanized to produce a product having rubberlike properties.

Third, to provide a propellant which may be compounded with commonly available paddle-type mixers such as are used in compounding rubber or similar materials, and which, prior to curing, will flow under its own weight to fill a mold of any shape.

Fourth, to provide a propellant which can be mixed and cured over a wide range of temperatures by using different vulcanizing agents in various quantities.

Fifth, to provide a propellant which may be so compounded as to be free of dispersed liquid fuels; that is, to provide a propellant which comprises, when cured, 100 percent solid without liquid content, thereby insuring good stability over long storage periods and avoiding evaporization losses.

Sixth, to provide a propellant which has excellent and uniform burning characteristics throughout a wide ambient or starting temperature range and throughout a wide pressure range.

With the above and other objects in view as may appear hereinafter, reference is directed to the specification which follows:

My propellant consists essentially of an oxidizer and liquid polysulfides to which are added suitable vulcanizing agents and accelerating agents. Plasticizers may be added if necessary.

Liquid polysulfides known to the trade as Thiokol LP-2 and LP-3 (designations adopted by the Thiokol Corporation) are examples of liquid polysulfides which have been found satisfactory; however, other liquid polysulfides having similar physical and chemical properties may be used.

Thiokol LP-2 is prepared as a disulfide from dichlor diethyl formal, 98%, and 1,2,3-trichlor propane, 2%. The structure may be represented as follows:

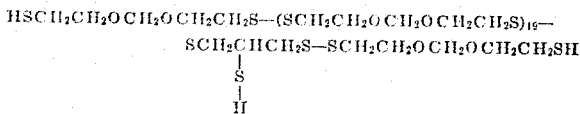

This means that for every 50 formal groups in the polymer chain there is one trichlor propane residue for cross-linking.

Thiokol LP-3 is probably similar to LP-2 except that it has only bout one-third the molecular weight of LP-2. It should be noted that the foregoing information was supplied by the Thiokol Corporation, manufacturers of Thiokol LP-2 and LP-3. The structural formula of LP-3 may be represented as follows:

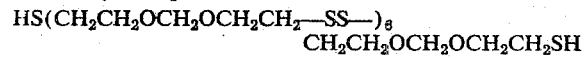

Experimentation has indicated that the propellant composition should have the following ingredients in the approximate proportions indicated:

| | Percent |
|---|---|
| Oxidizer | Between 50 and 85 |
| Liquid polysulfide | Between 15 and 50 |
| Plasticizer | Between 0 and 20 |
| Vulcanizer | Between .01 and 5 |
| Accelerator | Between 0 and 5 |

Five particular propellants which were produced and tested comprised:

COMPOSITION

| Propellant | Percent | | | | |
|---|---|---|---|---|---|
| | 1 | 2 | 3 | 4 | 5 |
| Oxidizer: | | | | | |
| Potassium perchlorate | 60.0 | | 50.0 | 50.0 | 50.0 |
| Ammonium perchlorate | 10.0 | 64.0 | 17.0 | 18.4 | 18.0 |
| Liquid polysulfide: | | | | | |
| Thiokol LP-2 | 19.5 | 25.7 | 23.0 | 30.4 | |
| Thiokol LP-3 | | | | | 30.0 |
| Vulcanizer: | | | | | |
| Paraquinone dioxime | | | 0.5 | 0.6 | 2.0 |
| Lead peroxide | 1.5 | 1.9 | | | |
| Dispersing medium for lead peroxide: Dibutyl phthalate | 1.5 | | | | |
| Plasticizer: Furfuryl alcohol | 7.2 | 8.0 | 7.51 | | |
| Control accelerator: | | | | | |
| Stearic acid | 0.35 | 0.4 | 0.69 | | |
| Zinc oxide | | | | 1.3 | 0.6 |

PREPARATION TEMPERATURES AND PHYSICAL PROPERTIES

| | | | | | |
|---|---|---|---|---|---|
| Mix temperature (° F.) | 70–80 | 70–80 | 70–100 | 200 | 140 |
| Cure temperature (° F.) | 70–80 | 70–80 | 150 | 240 | 200 |
| Shore hardness | 60 | 35 | 70 | 70 | 80 |

Other vulcanizers, accelerators, and plasticizers can be used to produce final products similar to those propellants described above. A list of some of these additional compounds which can be used with Thiokol LP-2 and Thiokol LP-3 liquid polysulfides are as follows:

| Vulcanizers | Accelerators | Plasticizers |
|---|---|---|
| Hexamethylene-tetramine.<br>Furfural. | Salicylic acid.<br>Maleic acid.<br>Zinc chromate.<br>Diphenol guanidine. | Furfural.<br>Phenol.<br>1-nitropropane.<br>Dinitropropane.<br>Dimethyloxyethoxyethyl azelate.<br>Orthonitrobiphenyl. |

Any other common oxygen donors besides potassium perchlorate and ammonium perchlorate may be used for oxidizers; for example, potassium nitrate or ammonium nitrate.

PREPARATION OF THE PROPELLANT

The preparation of the propellant may be divided into three stages:

(1) Mixing operation

The mixing operation is initiated with the charging of a conventional paddle-type mixer, such as is used in compounding rubber and synthetic rubber, with the propellant ingredients; i.e., both the oxidizer and the polysulfide, together with the plasticizer, vulcanizer, and/or accelerator. Agitation is started and heat is added to or subtracted from the propellant mixture as required for the specific propellant. Air can be withdrawn from the mixture if required. When suitable homogeneity is obtained, the propellant is poured into a mold of desired shape.

(2) Vulcanization

After the propellant is cast into the mold it is subjected to a suitable vulcanizing temperature for a time period necessary to completely vulcanize it. The cure temperature can range from 60° F. to 250° F. according to the propellant under consideration.

(3) Inhibiting

In many instances, in order to control more effectively the operation of the propellant in service, it is desirable to inhibit the burning of the propellant on predetermined surfaces. For example, it is usually desirable, in cases where relatively long burning periods are required, to inhibit all surfaces of cylindrical solid propellant body except on one end, so that the propellant body burns from one end only. This restricting or inhibiting is accomplished, in general, in either of two ways: (1) The inhibiting layer (popularly caller the liner) of material is lined within the mold prior to casting the propellant so that the liner and propellant cure together. (2) The liner is poured or sprayed on the propellant after the propellant is cured, and then the liner is cured. Several materials can be used for the liners, but, in general, best results are obtained with compositions comprising essentially the same ingredients as the propellant minus the oxidizer. It has been found, for best results, that a fabric tape should be wrapped around the liner when possible. The final propellant is a cartridge-like charge having rubber-like properties.

While the product described herein is particularly referred to as a rocket propellant, it is also adaptable for use as igniter material for rocket propellants. Also, it can be made to burn with brilliant white flame, making it useful for flares.

Various changes and alternate arrangements may be made within the scope of the appended claims, in which it is the intention to claim all novelty inherent in the invention as broadly as the prior art permits.

I claim:

1. A solid, resilient mechanical shock resistant rocket motor propellant capable of sustained combustion, consisting of: an oxidizer of the group consisting of potassium perchlorate, potassium nitrate, ammonium perchlorate and ammonium nitrate; and a vulcanized composition of polysulfide liquid, prior to vulcanizing, at ambient temperatures and having the general formula:

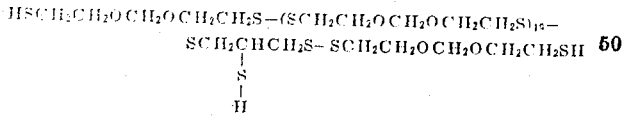

2. A solid, resilient mechanical shock resistant rocket motor propellant capable of sustained combustion, consisting of: an oxidizer of the group consisting of potassium perchlorate, potassium nitrate, ammonium perchlorate and ammonium nitrate; and a vulcanized composition polysulfide liquid prior to vulcanizing, at ambient temperatures and having the general formula:

$HS(CH_2CH_2OCH_2OCH_2CH_2-SS-)_6$
$CH_2CH_2OCH_2OCH_2CH_2SH$

3. A solid, resilient mechanical shock resistant rocket motor propellant capable of sustained combustion, consisting of: an oxidizer of the group consisting of potassium perchlorate, potassium nitrate, ammonium perchlorate and ammonium nitrate; and a vulcanized composition of a polysulfide which is liquid, prior to vulcanizing, at ambient temperatures and of the type prepared as a disulfide from dichlor diethyl formal and 1,2,3-trichlor propane.

4. A solid, resilient mechanical shock resistant rocket motor propellant capable of sustained combustion, consisting of: 50 to 85 parts oxidizer of the group consisting of potassium perchlorate, potassium nitrate, ammonium perchlorate and ammonium nitrate; and 50 to 15 parts vulcanized composition of a polysulfide which is liquid, prior to vulcanizing, at ambient temperatures, and of the type prepared as a disulfide from dichlor diethyl formal and 1,2,3-trichlor propane.

5. The herein described solid, resilient, mechanical shock resistant, rocket motor propellant capable of sustained combustion obtained by mixing 50 to 15 parts of a liquid polysulfide selected from a group having the general formulas:

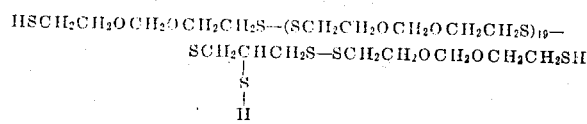

$HS(CH_2CH_2OCH_2OCH_2CH_2-SS-)_6$
$CH_2CH_2OCH_2OCH_2CH_2SH$ and an oxidizer in the amount of 50 to 85 parts selected from the group consisting of potassium perchlorate, potassium nitrate, ammonium perchlorate, and ammonium nitrate, and vulcanizing the mixture.

6. The herein described solid, resilient, mechanical shock resistant rocket motor propellant capable of sustained combustion obtained by mixing 50 to 15 parts of a liquid polysulfide having a general formula:

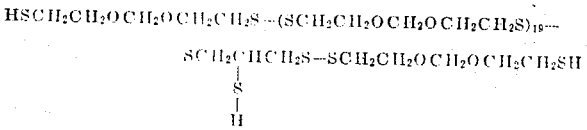

and an oxidizer in the amount of 50 to 85 parts selected from the group consisting of potassium perchlorate, potassium nitrate, ammonium perchlorate, and ammonium nitrate, and vulcanizing the mixture.

7. The herein described solid, resilient, mechanical shock resistant, rocket motor propellant capable of sustained combustion obtained by mixing 50 to 15 parts of a liquid polysulfide of the type prepared as a disulfide from the dichlor-diethyl formal and 1,2,3-trichlor-propane and an oxidizer in the amount of 50 to 85 parts selected from the group consisting of potassium perchlorate, potassium nitrate, ammonium perchlorate, and ammonium nitrate, and vulcanizing the mixture.

References Cited in the file of this patent

UNITED STATES PATENTS

| 85,482 | Schmitz | Dec. 29, 1868 |
|---|---|---|
| 393,634 | Favier | Nov. 27, 1888 |
| 625,634 | Karstaris | Nov. 27, 1888 |
| 1,363,095 | Dubrisay | Dec. 21, 1920 |
| 1,529,322 | Schapiro | Mar. 10, 1925 |
| 1,700,085 | Scott | Jan. 22, 1929 |
| 2,004,436 | Jaeger | June 11, 1935 |
| 2,067,213 | Snelling | Jan. 12, 1937 |
| 2,363,569 | Caldwell | Nov. 28, 1944 |
| 2,410,801 | Audrieth | Nov. 12, 1946 |
| 2,466,963 | Patrick et al. | Apr. 12, 1949 |

FOREIGN PATENTS

| 1,703 | Great Britain | 1855 |
|---|---|---|
| 1,062 | Great Britain | 1863 |
| 1,969 | Great Britain | 1882 |

OTHER REFERENCES

Thiokol Synthetic Rubber and Chemicals, Tech. Service Bulletin #103, page 1, published by Thiokol Corp., Trenton, N.J.

Thiokol Synthetic Rubber and Chemicals, "Impregnation of Leather With LP-2," published by Thiokol Corp., Trenton, N.J., March 21, 1946.

Thiokol VA-3 (No. 2), "VA-3 as Curing Agent for GR-S and Buna N Rubbers," published by Thiokol Corp., Trenton, N.J., January 29, 1945.